United States Patent

Ogawa

[19]

[11] Patent Number: 5,772,836
[45] Date of Patent: Jun. 30, 1998

[54] TURNING APPARATUS FOR TIRE COMPONENTS

[75] Inventor: Yuichiro Ogawa, Tokyo, Japan

[73] Assignee: Bridgestone Corporation, Tokyo, Japan

[21] Appl. No.: 806,778

[22] Filed: Feb. 26, 1997

[30] Foreign Application Priority Data

Feb. 27, 1996 [JP] Japan .................................. 8-065390

[51] Int. Cl.[6] ................................................. B29D 30/32
[52] U.S. Cl. ............................................ 156/400; 156/132
[58] Field of Search .................................... 156/400, 402, 156/398, 132

[56] References Cited

U.S. PATENT DOCUMENTS

| | | | |
|---|---|---|---|
| 2,931,420 | 4/1960 | Parr et al. ............................... | 156/400 |
| 3,010,868 | 11/1961 | Henley ..................................... | 156/400 |
| 3,016,321 | 1/1962 | Beckadolph et al. ................... | 156/402 |
| 3,785,905 | 1/1974 | Badenkov et al. ...................... | 156/400 |
| 3,971,694 | 7/1976 | Gazuit .................................... | 156/400 |
| 4,131,500 | 12/1978 | Wilde et al. ............................ | 156/402 |

FOREIGN PATENT DOCUMENTS

| | | | |
|---|---|---|---|
| 1145350 | 3/1963 | Germany ............................... | 156/400 |
| 44 16 514 A1 | 11/1994 | Germany . | |
| 733206 | 7/1955 | United Kingdom ................... | 156/132 |

*Primary Examiner*—Geoffrey L. Knable
*Attorney, Agent, or Firm*—Sughrue, Mion, Zinn, Macpeak & Seas, PLLC

[57] ABSTRACT

By turning toward the radially outer direction a turned-up region of a tire component by reciprocating turning fingers, and by positioning the reciprocation centre (the base of a short finger part) of the turning finger at the immediate vicinity of the departing point of the tire component from a bead-locking device, the compressing force provided at the turned-up region in the vicinity of the bead is effectively decreased, and therefore the generation of creasing is controlled.

10 Claims, 6 Drawing Sheets

TURNING APPARATUS FOR TIRE COMPONENTS

BACKGROUND OF THE INVENTION

1. Field of the Invention

The present invention relates to turning apparatus for tire components, and in particular to a turning apparatus which turns up the axially outer region of a tire component from the portion caught by the bead and bead-locking part of a tire building drum. The invention also relates to a turning method.

2. Description of the Prior Art

As a turning apparatus for a tire component it is well known to turn a tire component toward the radially outer direction by a bladder which expands when filled with air. However, the above apparatus has some problems, for example deterioration of the bladder and/or controlling the productivity of tire manufacture.

SUMMARY OF THE INVENTION

Therefore, the present inventor has previously devised (but not published or otherwise disclosed or commercially used) a novel turning mechanism as shown in FIGS. 6 and 7 of the accompanying drawings, that is an apparatus which uses turning fingers. Such apparatus has many turning fingers 12 arranged at determined intervals in the circumferential direction and extending substantially straight along planes passing the centre axis L of a tire building drum I 1, corresponding brackets 15 (see FIG. 6) which are fixed to the outside in the axial direction of the outer end portion in the radial direction of a bead-locking part 13 which is transferable in the radial direction, and to which the bases of the turning fingers 12 are connected rotatably through a pin 14, links 16 the heads of which are connected respectively to the turning fingers 12, and cylinders 18 comprised of cylinder cases 17 to which the bases of the links 16 are connected and which are movable in the axial direction, wherein when the cylinder cases 17 are moved in the axial inner direction, reciprocating force is thereby provided to all the turning fingers 12, and as a result the turning fingers 12 are reciprocatingly moved simultaneously in a standing direction along said plane.

In the case that such a turning mechanism turns up a tire component T, for example a turned-up region R of an axially outer side from the region caught by a bead B with a stiffener F and the bead-locking part 13 of the tire building drum 11, first, when the turning fingers 12 extend substantially parallel with the centre axis L of the tire building drum 11 and present a cylinder as a whole, the tire component T like a cylinder is carried and arranged to the outside of the tire building drum 11, and the bead B with the stiffener F is set at a determined position of the outside of the above tire component T. Then, the bead-locking parts 13 are transferred in the radially outer direction and both the end portions in the axial direction of the tire component T are caught by the bead B and the bead-locking part 13. The bead-locking parts 13 approach each other by a rotating screw axis 19 in the above state, while an inner chamber of the tire component T between the bead-locking parts 13 is filled with air, whereby the tire component T between the bead-locking parts 13 is transformed into a substantially toroidal form. Next, the cylinders 18 are supplied with fluid, the cylinder cases 17 approach in the axially inner direction and the links 16 are reciprocatingly moved toward the radial outer direction (the standing direction). As a result, the turning fingers 12 are provided with reciprocating force by these links 16 and are reciprocatingly moved simultaneously in the radially outer direction (the standing direction), and the tire component T (the turned-up region R) of the axially outer side from the above caught region is turned up toward the radially outer direction.

However, in the above-described turning mechanism for the tire component, there is a problem that creasing generates at the turn-up region R in the vicinity of the beads B. The reason for this is as follows: an optional point A1 on the tire component T when it presents a cylinder, would transfer to a point A2 if the turning mechanism were turned up without slack (the components are bent in an arc in the vicinity of the bead B and therefore the point would transfer to the radially inner point by a small distance Z1 from the point A3 on the arc K1 the centre of which is the departing point C from the bead-locking part 13). Meanwhile, the point F1 on the turning finger 12 which contacts the point A1 is transferred to the point F2 on the arc K2 by reciprocation the centre of which is the pin 14 of the turning finger 12. The point F2 is positioned at the radially inner side by a distance L3 from the point A2 because the reciprocation centre (the centre axis of the pin 14) of the turning finger 12 is positioned at the radially inner side by a distance L1 from the point C and at the axially outer side by a distance L2 from the point C. Here, the tire component T, which contacts the turning finger 12, consists of coating cords with unvulcanised rubber and therefore it hardly slips on the turning finger 12 because of its own tackiness when it is turned. As a result, creasing generates at times in the turned-up region R in the vicinity of the bead B because of compression in the direction of arrows shown in the drawing (FIG. 7).

The object of the present invention is to provide a turning apparatus for a component of a tire which satisfactorily turns the tire component, especially the turned-up region in the vicinity of the bead, while controlling the generation of creasing.

The present invention in one aspect provides turning apparatus for a tire component, which turns toward the radially outer direction the axially outer region of a tire component, which is arranged outside a tire building drum and presents a cylinder, from the portion thereof caught by a bead, which is set at a determined position of the outside of the tire component, and a bead-locking part of the tire building drum, characterized in that the apparatus further comprises turning fingers for turning the tire component which are connected rotatably to the bead-locking part and which can be bent.

In a preferred embodiment, the invention provides turning apparatus for a tire component, which turns toward the radially outer direction the axially outer region of a tire component which is arranged outside a tire building drum and presents a cylinder, from the portion thereof caught by a bead with a stiffener which are set at a determined position of the outside of the tire component and a bead-locking part of the tire building drum, wherein the apparatus further comprises many turning fingers comprised of short fingers and long fingers, the short fingers of which are arranged at determined intervals in the circumferential direction and extend along planes respectively passing the centre axis of the tire building drum, the bases of the short fingers of which being connected rotatably to the bead-locking part such that the bases are inserted in grooves formed at the axially outer end portion of the radially outer end portion of the bead-locking part, and the bases of the long fingers of which being connected rotatably to the heads of the short fingers, and the long fingers of which are longer than the short fingers, connecting links of the same number as that of the turning fingers the bases of which are connected rotatably to the bead-locking part at the radially inner side from the bases of the short fingers, and the heads of which are connected rotatably to the long fingers and which extend along the above planes, and reciprocating means for reciprocating simultaneously the turning fingers and the connecting links along the above planes by providing reciprocating force to all the long fingers.

The invention in another aspect provides a turning method for a tire component, comprising arranging the tire component outside of a tire building drum, setting a bead at a determined position of the outside of the tire component, catching the tire component by the bead and a bead-locking part of the tire building drum and turning toward the radially outer direction the axially outer region of the tire component from the portion thereof caught by the bead and the bead-locking part, characterized in that the tire component is turned by turning fingers which can be bent.

In the case that the tire component, in the turned-up region at the axially outer side from the portion caught by the bead and the bead-locking part, is turned by such a turning apparatus, first, when the turning fingers extend substantially parallel with the centre axis of the tire building drum and present a cylinder as a whole, the tire component is arranged on the outside of the tire building drum and a bead with a stiffener are set on the determined position of the outside of the tire building drum, and then the bead-locking part is transferred in the radially outer direction and the tire component is caught by the bead and the bead-locking part. Next, the turning fingers and the connecting links are reciprocatingly moved toward the radially outer direction by the reciprocating means and the above turned-up region of the tire component is turned toward the radially outer direction. At this time, the oscillation centre (the bases of the short fingers) of the turning fingers are positioned in grooves formed at the axially outer end portion of the radially outer end portion of the bead-locking part, and therefore the oscillation centre is positioned at the immediate vicinity of the departing point (the turn-starting point of the turn-up region) of the tire component from the bead-locking part. As a result, the compressing force provided at the turned-up region in the vicinity of the beads is effectively decreased and the generation of creasing is controlled. Also, when the turning fingers are reciprocatingly moved as mentioned above, the connecting links control the turning fingers so that the turning fingers are bent gradually accompanied by progress of the reciprocation, in other words so that the supplementary angle between the short fingers and the long fingers is gradually increased, and therefore the turned-up region in the vicinity of the beads is smoothly and adequately transformed along the outside shape of the bead and the stiffener which bend in an arc.

DESCRIPTION OF THE PREFERRED EMBODIMENTS

Figure 1:
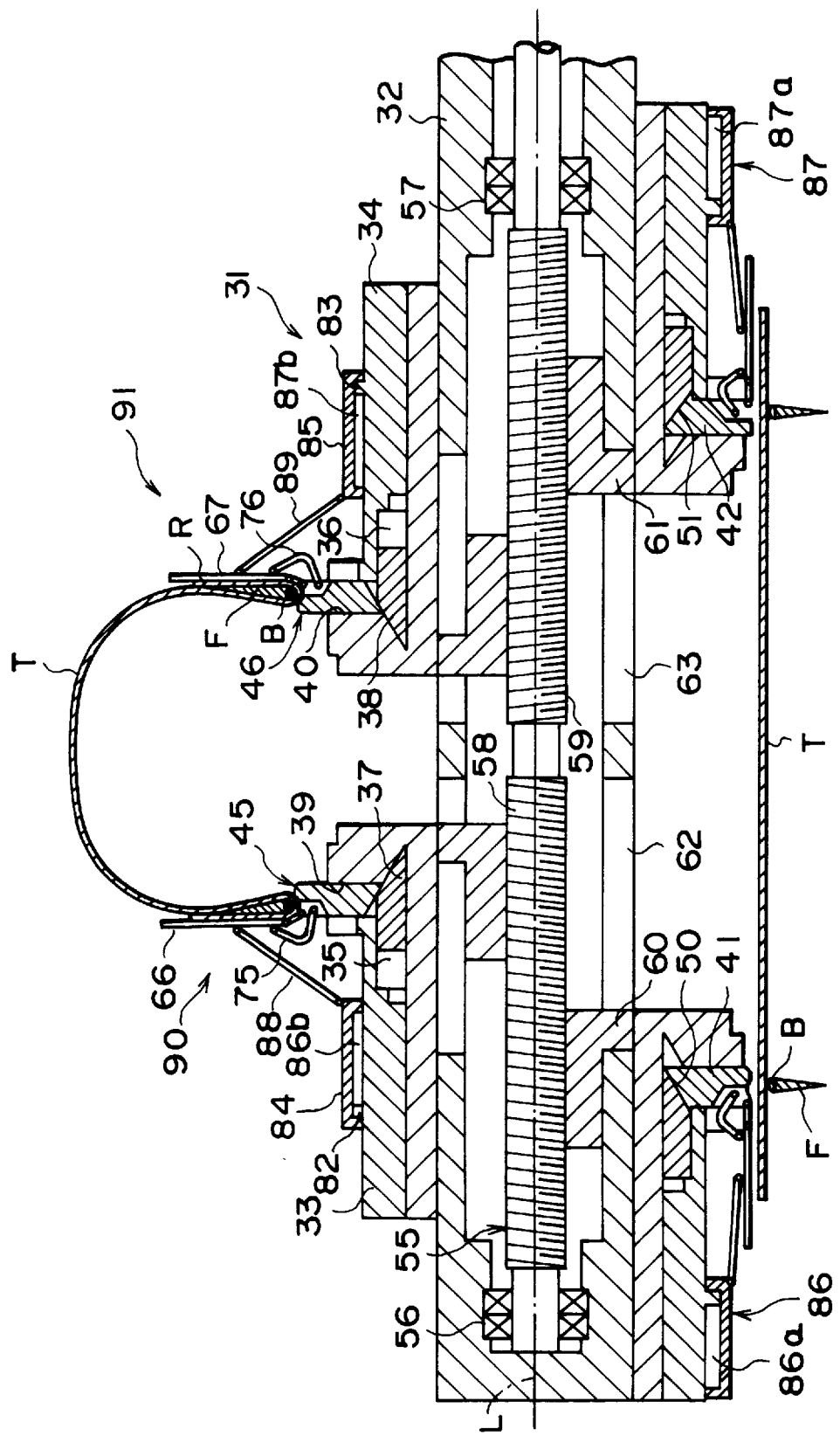
FIG. 1 is a front sectional view of an embodiment of a turning apparatus according to the invention, the upper half of which shows the state when a tire component is turned, and the lower half of which shows the state when the tire component is not thus turned.
Figure 2:
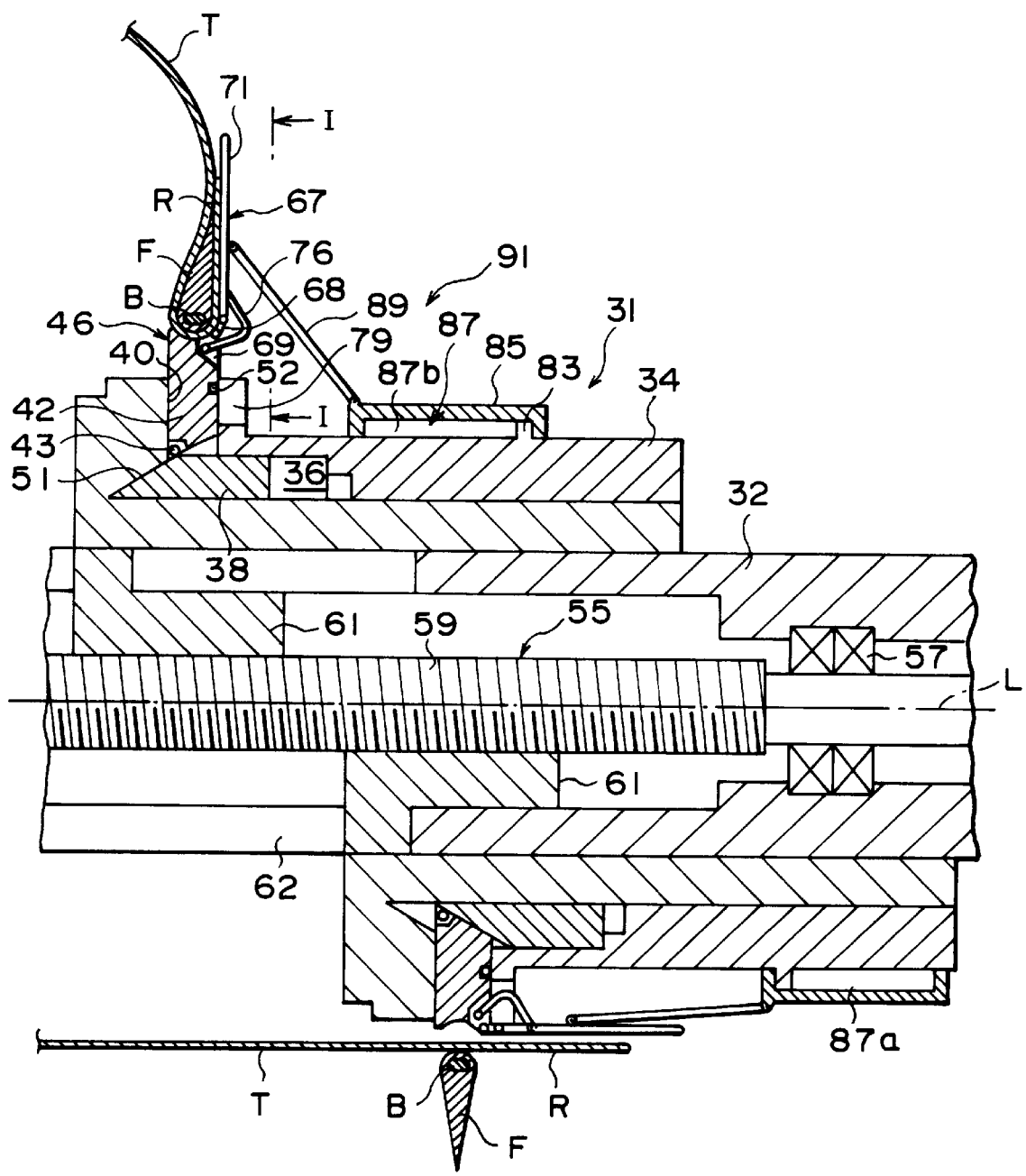
FIG. 2 is a front sectional view similar to FIG. 1, which shows the vicinity of the turning finger at the base side.
Figure 3:
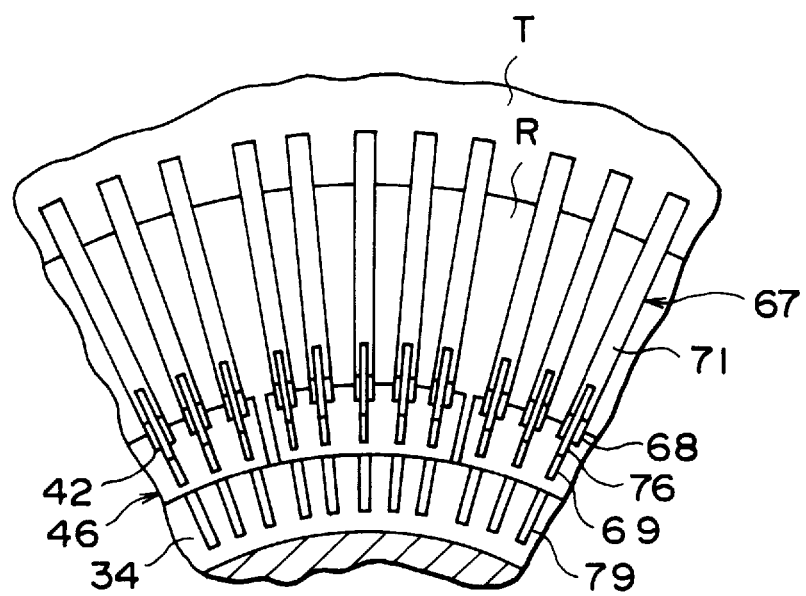
FIG. 3 is a sectional view taken in the direction of the arrows I—I in FIG. 2.

In the FIGS. 1 and 2, the numeral 31 denotes a level tire building drum. The base portion of the drum 31 is supported on a driving portion which provides driving force, air and so on. The tire building drum 31 has a main shaft 32 which is rotatable and presents a hollow cylinder. Slides 33,34 transferable in the axial direction of the main shaft 32 fit slidably to the A outsides of the head portion and the base portion of the main shaft 32, respectively. In the slides 33,34 are formed ring-shaped cylinder chambers 35,36 with the same shaft as the main shaft 32, respectively. In the cylinder chambers 35,36 are slidably housed ring-shaped pistons 37,38 transferable in the axial direction of the main shaft 32, respectively. Numerals 39,40 denote a plurality of guiding recesses which are formed at the slides 33,34 and extend in the radial direction. The recesses 39,40 are arranged at even intervals in the circumferential direction. The radially inner ends of the recesses 39,40 open into the cylinder chambers 35,36 and the radially outer ends open into the outer periphery of the slides 33,34. Into the recesses 39,40 are inserted segments 41,42 which transfer in the radial direction while guided by a guide (not shown in the drawings). At the radially inner ends of the segments 41,42 are supported rotatable rollers 43, respectively. A plurality of segments 41,42, as mentioned above, comprise bead-locking parts 45,46 as a whole, which are arranged so as to surround the cylinder chambers 35,36 from the radially outer direction and present a circle.

Meantime, at the outer periphery of the axially inner end portion of the pistons 37,38 are formed inclined faces 50,51 respectively, which are inclined so that they approach the axis of the main shaft 32 in proportion as the axially inner side (toward the centre of the main shaft 32 in the axial direction). The rollers 43 of the segments 41,42 rotate on and contact the inclined faces 50,51. As a result the cylinder chambers 35,36 are supplied with air, and the pistons 37,38 move toward the axially inner direction in the cylinder chambers 35,36, whereby each segment 41,42 is pushed by the rollers 43 and the inclined faces 50,51 and the bead-locking parts 45,46 are expanded in diameter. Numeral 52 denotes ring-shaped return springs which are anchored at the radially outer end portions of each of the segments 41,42 and provide the segments with force in the radially inner direction. When the air supply to the cylinder chambers 35,36 is stopped, the return springs 52 push each segment 41,42 (which has been pushed in the radially outer direction) in the radially inner direction, the bead-locking parts 45,46 are reduced in diameter and the pistons 37,38 are moved in the axially outer direction.

Numeral 55 denotes a screw shaft which fits into the main shaft 32 with play with the same shaft as the main shaft 32. Both of the end portions in the axial direction of the screw shaft 55 are supported rotatably to the main shaft 32 through bearings 56,57. On the outer peripheries of the head portion and the base portion of the screw shaft 55, male screws 58,59 are formed respectively, which are in inverse screw direction to each other in relation to the centre in the axial direction of the main shaft 55 as the boundary. Numerals 60,61 are screw members which are inserted slidably into slits 62,63 formed in the main shaft 32 and extending in the axial direction. The screw members 60,61 are fitted helically to the male screws 58,59 of the screw shaft 55, respectively and are connected to the slides 33,34, respectively. As a result, when the screw shaft 55 rotates by means of driving force from the driving portion, the screw members 60,61 and the slides 33,34 move along the main shaft 32 with the same distance in inverse direction and approach or separate from each other while they are guided by the slits 62,63.

In the FIGS. 1, 2, 3 and 4, numerals 66,67 denote many turning fingers which are arranged to surround the circumference of the slides 33,34. The turning fingers 66,67 are arranged at determined intervals in the circumferential direction and extend substantially straight along planes passing the centre axis L of the tire building drum 31. The length of the turning fingers 66,67 is a little longer than that of the turned-up region R of the tire component T which is mentioned below. The turning fingers 66,67 each have a short finger 68 respectively, which is positioned at the base side. The bases of the short fingers 68 are inserted into corresponding grooves 69 respectively, formed at the bead-locking parts 45,46, specifically at the axially outer end portion of the radially outer end portion of the segments 41,42 and are connected rotatably to the bead-locking part 45,46 (the segments 41,42) through pins 70 (see FIG. 4). Numeral 71 denotes long fingers the bases of which are connected rotatably to the heads of the short fingers 68 through pins 72 (see FIG. 4). The length of the long finger 71 (the distance between the pin 72 and the head) is longer than that of the short finger 68 (the distance between the pin 70 and the pin 72).

Here, the length of the short finger 68 is about a half of the radius or the section maximum width of the bead B which is mentioned below. The short fingers 68 and the long fingers 71 as a whole comprise the above turning fingers 66,67.

Figure 4:
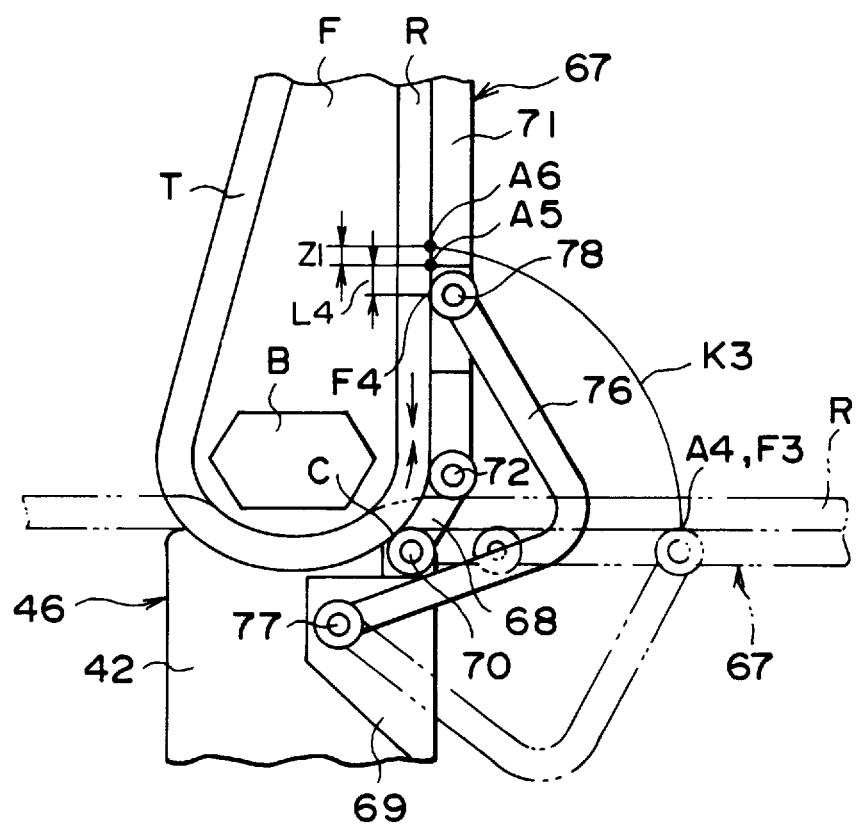
FIG. 4 is an enlarged front sectional view in the vicinity of the turning finger.

Numerals 75,76 denote connecting links of the same number as the number of turning fingers 66,67, which are arranged at determined intervals in the circumferential direction and have a shape like a letter L. The connecting links 75,76 extend along planes passing the centre axis L of the tire building drum 31 like the turning fingers 66,67. The bases of the connecting links 75,76 are inserted into the grooves 69 formed at the bead-locking parts 45,46 respectively, and are connected rotatably to the bead-locking part 45,46 (the segment 41,42) at a position which is slightly radially inward and slightly axially inward relative to the bases of the short fingers 68 through pins 77 (FIG. 4), while the heads are connected rotatably to base portions of the long fingers 71 through pins 78 (FIG. 4). Numeral 79 denotes grooves which are formed at the slides 33,34 in order to avoid interference with the slides 33,34 when the connecting links 75,76 are reciprocatingly moved.

Pistons 82,83 are formed on the outer peripheries of the slides 33,34 at the axially outer side from the guiding recesses 39,40, respectively. The outer peripheries of the pistons 82,83 are retained slidably by the inner peripheries of cylinder cases 84,85 which fit to the outside of the slides 33,34 movably in the axial direction. Thereby, cylinder chambers 86,87 formed by the cylinder cases 84,85 and the slides 33,34 are sectioned by the pistons 82,83 into respective cylinder sectioned-chambers 86a, 86b, 87a and 87b. Numerals 88,89 denote links of the same number as the number of the turning fingers 66,67, which are arranged at determined intervals in the circumferential direction. The links 88,89 extend along planes passing the centre axis L of the tire building drum 31 like the turning fingers 66,67. The bases of the links 88,89 are connected rotatably to the outer peripheries of the inner end portions of the cylinder cases 84,85, and the heads of the links 88,89 are connected rotatably to the centre portions of the long fingers 71. As a result, when the cylinder cases 84,85 are moved simultaneously toward the axially inner direction by supplying the cylinder sectioned-chambers 86b, 87b with air, all the long fingers 71 are provided with reciprocating force of standing direction, whereby the turning fingers 66,67 and the connecting links 75,76 are reciprocatingly moved simultaneously toward the radially outer direction along said plane. The pistons 82,83, the cylinder cases 84,85 and the links 88,89 as a whole comprise reciprocating means 90,91 which reciprocatingly move simultaneously the turning fingers 66,67 and the connecting links 75,76 in said plane by providing all the long fingers 71 with reciprocating force.

Next, the function of the turning apparatus of present invention as described above will be explained.

When a tire component T, say the turned-up region R positioned in the axially outer direction from the portion caught by the bead B with the stiffener F and the bead-locking parts 45,46 is turned by such turning apparatus, first a cylinder-like tire component T, for example a carcass band, is formed at another tire building drum (not shown in the drawings), and then the tire component T is carried to the outside of the tire building drum 31 by a carrying device (also not shown in the drawings). At this time, the turning fingers 66,67 present as a whole a cylinder because they fall down until they are substantially parallel with the centre axis L of the tire building drum 31. The slides 33,34 stop at the determined positions which are remote from each other and the bead-locking parts 45,46 stop at the position where they are most reduced in diameter. Such a carrying device carries a pair of the beads B with the stiffeners F and sets the beads B with the stiffeners F at the determined position on the outside of the tire component T, that is the radial outside of the bead-locking parts 45,46 respectively.

Next, when the pistons 37,38 are moved in the axially inner direction by supplying the cylinder chambers 35,36 with air, the bead-locking parts 45,46 move in the radially outer direction and expand in diameter by virtue of the rollers 43 and the inclined faces 50,51, while the bead-locking parts 45,46 stretch the return springs 52. As a result, both of the end portions in the axial direction of the tire component T are caught in a narrow range by the bead B and the bead-locking parts 45,46. At this time, the base portions of the turning fingers 66,67 move toward the radially outer direction with the bead-locking parts 45,46 while the cylinder cases 84,85 do not move. Therefore, the turning fingers 66,67 become slightly inclined to approach to the centre axis L of the tire building drum 31 toward the heads (toward the axially outer direction), that is they taper off as a whole. Next, the screw shaft 55 is provided with rotating driving force from the driving portion and the screw shaft 55 rotates. Thereby, the screw members 60,61, the slides 33,34 and bead-locking parts 45,46 move in the axially inner direction with the same distance while they are guided by the slits 62,63, and approach each other. At this time, the interior of the tire component T between the bead-locking parts 45,46 is filled with air, whereby the tire component T between the bead-locking parts 45,46 is transformed into a substantially toroidal form.

Figure 7:
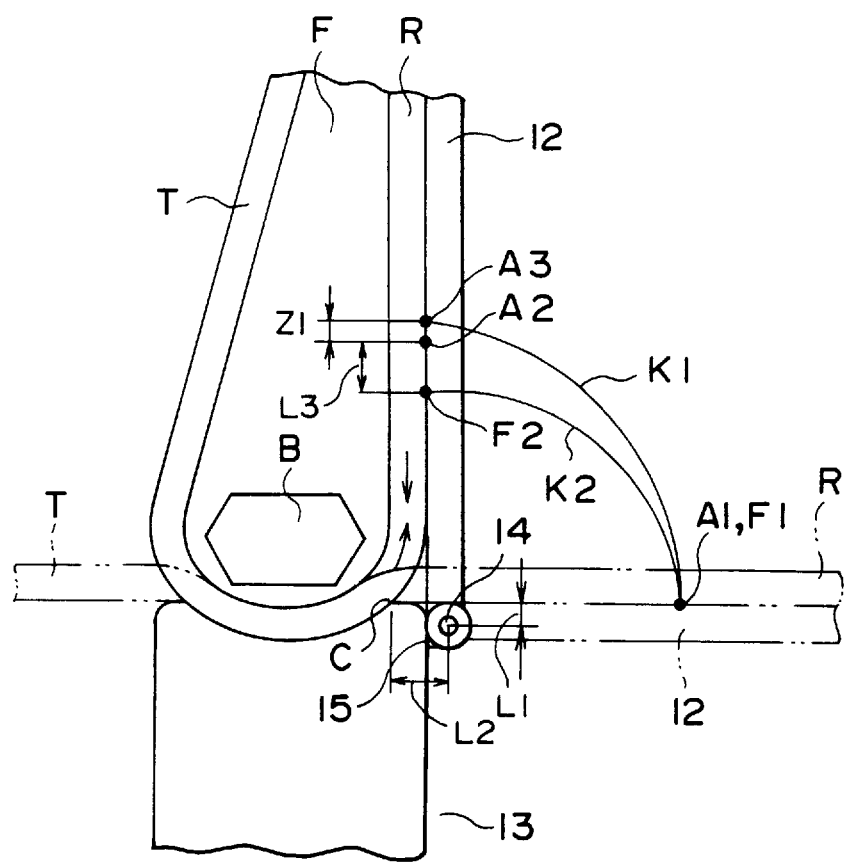
FIG. 7 is an enlarged front sectional view in the vicinity of the turning finger of the apparatus shown in FIG. 6.

Next, when the cylinder cases 84,85 are moved simultaneously toward the axially inner direction by providing cylinder sectioned-chambers 86b, 87b with air, all the links 88,89 and all the long fingers 71 are provided with reciprocating force of standing direction, whereby the turning fingers 66,67 and the connecting links 75,76 are reciprocatingly moved along said planes simultaneously toward the radially outer direction. As a result, the tire component T at the axially outer side from the bead B, that is the turned-up region R, is turned toward the radially outer direction by the turning fingers 66,67 while it is opened. At this time, the turning fingers 66,67 are bent at the connecting point of the short fingers 68 and the long fingers 71, and the turning fingers can be transformed along the outside shape of the bead B and the stiffener F. Therefore, the reciprocation centre (the base of the short finger 68) of the turning fingers 66,67 can be positioned at the very vicinity of the departing point C (the turn-starting point of the turned-up region R) of the tire component T from the bead-locking parts 45,46, in other words in the grooves 69 of the bead-locking parts 45,46. For example, an optional point A4 (see FIG. 4) on the tire component, when it presents a cylinder, is transferred to a point A5 when the turned-up region R has been turned without slack (because the region is bent like an arc in the vicinity of the beads B, the point is transferred at the radially inner side by a smaller distance Z1 than a point A6 on an arc K3 the centre of which is the departing point C from the bead-locking parts 45,46). Meanwhile, a point F3 on the turning fingers 66,67 which contacts the point A4 is transferred to a point F4 to which a distance L4 from a point A5 is much shorter than a distance L3 (see FIG. 7) because the turning fingers 66,67 bend so that the centre is the pins 70, as mentioned above, while they are reciprocated. Thereby, the compressing force in the direction of the arrow provided in the turned-up region R in the vicinity of the bead B is effectively decreased, and therefore the generation of creasing is controlled. Also, when the turning fingers 66,67 are reciprocatingly moved as mentioned above, the connecting links 75,76 control the turning fingers 66,67 so that they gradually bend accompanied by the progress of the reciprocation, that is so that the supplementary angles formed by the short fingers 68 and the long fingers 71 gradually increase, and therefore transform smoothly and adequately the turned-up region R in the vicinity of the bead B along the outside shape of the bead B and the stiffener F which bend like an arc.

Figure 5:
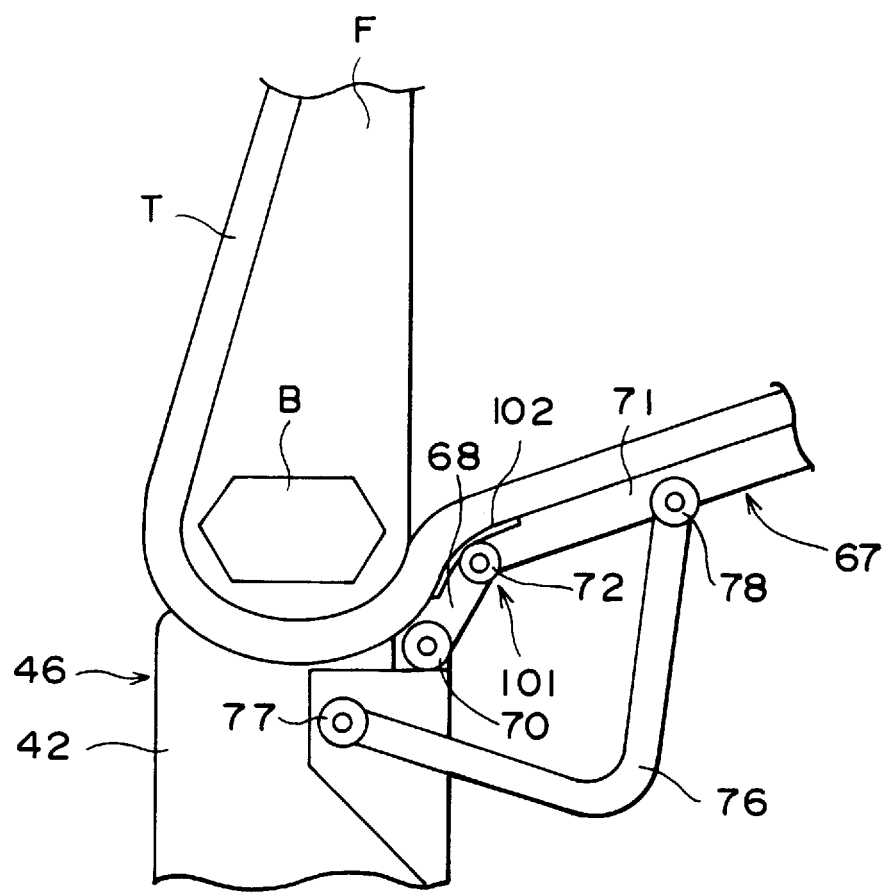
FIG. 5 is an enlarged front sectional view in the vicinity of a modified embodiment of a turning finger.
Figure 6:
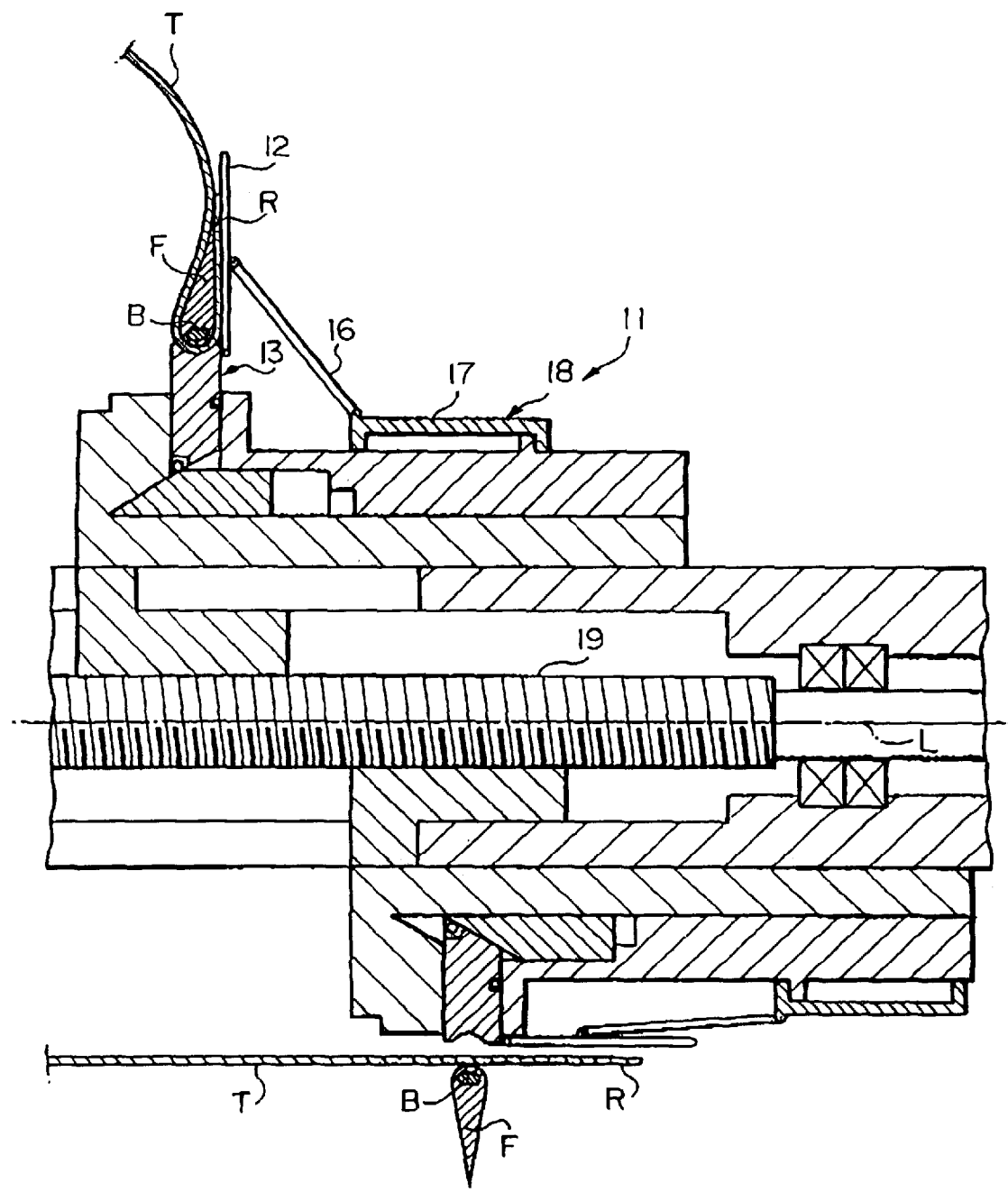
FIG. 6 is a front sectional view similar to FIG. 2, which shows an example of a turning apparatus as described hereinabove.

It is preferable, as shown in FIG. 5, that a force-providing means 102 for providing force of anti-turning direction, for example a spring, is arranged at a connecting portion 101 of the turning finger parts, because thereby it is easier that the turning finger is gradually bent, and that the radially innermost turning finger part approaches precedingly to a final position of turning, by cooperation with the connecting link 75,76 or solely.

Therefore, the turning can be easily accomplished smoothly and adequately.

As explained above, according to the invention, a tire component, especially a turned-up region in the vicinity of a bead, can be turned satisfactorily while the generation of creasing is controlled.

While the invention has been particularly shown and described with reference to certain preferred embodiments thereof, it will be understood by those skilled in the art that various changes and modifications may be made within the spirit and scope of the invention.

I claim:

1. An apparatus for turning a tire component which is arranged outside a tire building drum and presents a cylinder and having a portion thereof caught by a bead, which is a set at a determined position of the outside of the tire component, and a bead-locking part of the tire building drum, said apparatus comprising bendable turning fingers for turning the tire component, said turning fingers connected rotatably to the bead-locking part wherein the turning fingers comprise short finger parts and long finger parts, bases of the short finger parts connected to the bead-locking part, and bases of the long finger parts connected rotatable to heads of the short finger parts, and the long finger parts are longer than the short finger parts, connecting links for said turning fingers, the bases or said connecting links rotatable connected to the bead-locking parts at a radially inner side relative to the bases of the short finger parts, and heads of said connecting links being rotatable connected to the long finger parts and radially extending.

2. Apparatus according to claim 1, wherein the bases of the turning fingers are connected rotatably to the bead-locking part in the vicinity of a departing point of the tire component from the bead-locking part.

3. Apparatus according to claim 1, wherein the bases of the turning fingers are inserted into grooves formed at the axially outer end portion of the radially outer end portion of the bead-locking part.

4. Apparatus according to claim 1, wherein each turning finger comprises a plurality of finger parts which are connected.

5. Apparatus according to claim 4, further comprising a spring which is arranged at a connecting portion by the turning fingers parts and provides force in an anti-turning direction.

6. Apparatus according to claim 1, wherein the turning fingers are arranged at determined intervals in the circumferential direction and extend respectively along planes passing the centre axis of the tire building drum.

7. Apparatus according to claim 1, further comprising reciprocating means for providing reciprocating force to the turning fingers.

8. Apparatus according to claim 7, wherein the reciprocating means provide reciprocating force to long finger parts of the turning fingers.

9. The apparatus according to claim 7, wherein said reciprocating means provide a reciprocating force to the connecting links.

10. An apparatus for turning a tire component which is arranged outside a tire building drum and presents a cylinder and having a portion thereof caught by a bead with a stiffener which are set at a determined position of the outside the tire components and a bead-locking part of the tire building drum, said apparatus comprising bendable turning fingers comprised of short fingers and long fingers, the short fingers of arranged at determined intervals in the circumferential direction and extending along planes which pass through the centre axis of the tire building drum, the bases of the short fingers being connected rotatably to the bead-locking part of the tire building drum such that said bases are inserted in grooves formed at the axially outer end portion of the radially outer end portion of the bead-locking part, and the bases of the long fingers connected rotatably to the heads of the short fingers, the long fingers being longer than the short fingers, said connecting links of the same number as the turning fingers, the bases of said connecting links connected rotatably to the bead-locking part at the radially inner side from the bases of the short fingers, and the head of said connecting links connected rotatably to the long fingers and which extend along said planes, and reciprocating means for reciprocating simultaneously the turning fingers and connecting links along the above planes by providing reciprocating force to all the long fingers.

* * * * *